2,755,204
PROCESS FOR COATING METAL WITH FURFURAL RESIN

Philip L. Carter, Media, Pa., assignor to Sun Oil Company, Philadelphia, Pa., a corporation of New Jersey No Drawing. Application December 8, 1952, Serial No. 324,840

11 Claims. (Cl. 117—66)

This invention relates to the inhibition of metallic corrosion by means of a corrosion-resistant coating for metal surfaces.

Numerous proposals for inhibiting metallic corrosion by the use of coating materials have been made heretofore. Some of these proposals have been practiced commercially, but are generally subject to the disadvantage that the coating processes employed are complicated and therefore difficult to preform and expensive. Most coating compositions of the prior art contain multiple ingredients and require very careful formulation; in the case of synthetic resin coatings, it is generally necessary to conduct a carefully controlled polymerization of resin-forming materials and to subsequently process the resin formed in order to obtain the resin component of the coating composition. The manner of applying and curing the coating composition is also frequently difficult and expensive.

The present invention provides a high degree of corrosion inhibition by means of a corrosion-resistant coating which can be prepared in a remarkably simple manner. The coating which provides the corrosion resistance according to the invention consists essentially of furfural resin, which is a material obtained by the resinification of furfural under conditions such that furfural is substantially the sole resin-forming material.

The preparation of a furfural resin coating according to the present invention involves the following steps: resinification of furfural; formation of a coating composition containing the resin formed; application of the coating composition to the metal surface; and thermally curing the furfural resin on the metal surface. These steps can be performed as a plurality of separate operations if desired. However, they can also be performed concurrently in a remarkably simple manner, as in one highly advantageous embodiment of the invention, which will be subsequently more fully described.

First, the steps in the coating process will be considered separately, beginning with the resinification of furfural. Furfural resinifies to some extent upon standing at room temperature, but elevated temperature, preferably in the range 100° C. to 250° C., and more preferably in the range 130° C. to 180° C., accelerates the resinification. Known catalysts also accelerate the resinification, e. g. inorganic acids and bases, metals, salts, etc. If a catalyst is used it should be employed in minor amount preferably 0.1 to 10 weight percent. The resinification can also be accelerated by the introduction of added free-oxygen-containing gas into the furfural. The resinification can be aided also by the presence of a desiccant, the effect probably being to absorb or adsorb water formed as product of condensation of furfural, thereby to shift the reaction equilibrium toward the product side. Suitable desiccants include calcium chloride, glycerol, glycols, lithium chloride, phosphoric acid, alkali metal hydroxide, sulfuric acid, alumina, calcium sulfate, silica gel, etc. If a desiccant is uesd, it should be employed in a minor amount relative to the furfural, preferably in amount corresponding to 0.1 to 10 percent by weight of the furfural.

If the temperature employed in the resinification operation is high enough to vaporize substantial amounts of furfural under atmospheric pressure, the resinification should be conducted either with condensation and reflux of evolved vapors or under pressure sufficient to prevent substantial vaporization.

The time required to obtain the desired degree of resinification depends on the conditions employed. The course of the resinification can be followed by periodic measurements of either the viscosity or resin content of the resin-furfural mixture, and the resinification can be terminated when the desired viscosity or resin content is obtained. Generally, it is advisable to terminate the resinification before the resin content exceeds 10 weight percent and before the viscosity exceeds 50 centistokes at 100 F., since there is a tendency, when the resin content and viscosity become too high, for the resin-furfural mixture to gel. Resin contents may be determined by contacting the resin-furfural mixture with a solvent, e. g. xylene or toluene, to dissolve the furfural, and filtering out the resin, the latter then being washed, dried, and weighed.

The second step, formation of the coating composition containing furfural resin, may be inherently performed in the first or resinification operation, by virtue of the fact that the furfural resin formed in the first step becomes suspended in furfural to form a suspension which can be used as a coating composition. The resin content of the coating composition thus formed depends on the extent of the resinification and can be further modified by dilution with additional furfural, if it is desired to reduce the resin content of the coating composition before applying it to the surface of the metal to be coated.

If it is desired to employ a carrier other than furfural in the coating composition, the furfural resin obtained in the resinification can be separated from the unresinified furfural, e. g. in the manner described previously in connection with determination of resin content, and incorporated in a coating composition comprising other constituents for various purposes as known in the coating composition art.

The third step, application of the coating composition to the surface of the metal to be coated, may also be inherently accomplished in the resinification operation provided that the metal surface to be coated is in contact with the resin-furfural mixture during the course of the resinification. However, the application step can also be performed subsequently and separately in a variety of ways which are known in the coating art, as by dipping the metal in the coating composition, or by bushing or spraying the coating composition on the metal surface. Also, the coating composition may be applied to the surface of metal equipment to be coated by flowing the coating composition through the metal equipment in contact with the surfaces to be coated.

The final step of curing the furfural resin on the metal surface may also be inherently performed in any of the previous operations provided that the coating composition in such previous operations is contacted with the metal surface to be coated at a temperature of at least 100° C. The curing step can also be performed subsequently to and separately from all of the preceding operations by applying the coating composition to the metal surface at a temperature below 100° C. to cure the furfural resin in the coating composition on the metal surface.

The temperature of the coating composition in the curing step is preferably not above 250° C. and more preferably in the range 130° C. to 180° C. It must be at least 100° C. in any case in order to obtain a hard, adherent coating. Where the temperature is high enough to vaporize substantial amounts of the coating composition at atmospheric pressure, the operation is preferably conducted either with condensation and reflux of evolved vapors or under pressure sufficient to prevent substantial vaporization.

The curing operation may be performed by baking after previous application of the coating composition, as by dipping, spraying, brushing, etc., but a preferred manner of curing is by maintaining the metal surface in contact with a body of excess coating composition at a temperature of at least 100 C. for a period of time sufficient to build up the desired thickness of coating. Preferably, the coating composition employed consists essentially of a suspension of furfural resin in furfural, the resin content not being greater than about 8 weight percent, and the viscosity not being greater than about 45 centistokes at 100° F.

The rate of formation of coating in an operation where an excess of the coating composition is maintained in contact with the metal surface to be coated depends on a variety of factors including the nature of the metal, the composition and temperature of the coating material, and the condition of the metal surface, generally, it appears that rough surfaces favor the rapid formation of the coating.

Incorporation of petroleum sulfonic acids, e. g. mahogany or green sulfonic acids, in minor amount, preferably 0.1 to 10 weight percent, in a coating composition according to the invention provides an increase in the rate of coating formation in a coating operation employing such coating composition.

Generally, the rate of formation of the coating, in an operation where an excess of the coating composition is maintained in contact with the metal surface, can be increased by incorporating a minor amount, preferably 0.1 to 10 percent by weight, of a surface active agent, e. g. an alkali metal alkyl sulfate in the coating composition. Other suitable surface active agents for this use are fatty acid soaps, petroleum naphthenates, petroleum sulfonates, sulfated castor oil, sulfated alcohols, aliphatic sulfonates, alkyl aryl sulfonates, sulfated aliphatic esters, substituted oxazoline derivatives such as the reaction product of oleic acid and aminomethyl 1,3-propanediol, sulfated amines, sulfated amides, ruby oleine red oils, soluble oils, polyoxyakylene ethers of partial fatty acid esters, e. g. sorbitan monolaurate, etc. Surface active agents generally are suitable for this purpose. Also, according to the invention, a surface active agent may advantageously be incorporated in the coating composition where the latter is applied to the metal surface and cured in a subsequent, separate operation.

In the preferred operation according to the invention, whereby an excess of a coating composition comprising furfural resin and furfural at a temperature of at least 100° C. is maintained in contact with the metal surface for an extended period of time, it is to be noted that the resin content of the furfural in the coating composition may increase during the operation through further resinification of the furfural, unless the rate of deposition of the resin on the surface of the metal equals or exceeds the rate of resinification of the furfural. Also, the acidity of the furfural may increase. Accordingly, it may be desirable to counteract the tendency for increased resin content and acidity by periodically or continuously adding furfural having relatively low acidity and resin content, and also if desired by periodically or continuously removing a portion of the excess furfural and resin from the coating zone. Similarly, in operation where a coating composition comprising furfural and furfural resin is continuously circulated through a cyclic system including a coating zone or equipment whose surfaces are to be coated, it may be desirable to continuously withdraw a drag stream from the circulating coating composition and replace the drag stream with furfural having low acidity and resin content.

It is noted that, since resinification of furfural takes place during a curing operation in which an excess of furfural and furfural resin at a temperature of at least 100° C. is maintained in contact with the metal to be coated, it is not necessary that a furfural-containing coating composition have any furfural resin in it at the beginning of the curing step, since it will be formed during the progress thereof and deposited on the metal surface. Thus, a separate resinification step is not necessary though it may be desirable in some instances to conduct a separate resinification to an acidity of at least 0.5 weight percent measured as acetic acid equivalent, or to a viscosity of at least 1.5 centistokes. The acidity of the furfural may be determined by dissolving a weighed amount of the furfural in hot water and titrating with 0.1 normal KOH using phenolphthalein as indicator.

In a highly advantageous embodiment of the invention, all four operations of the coating process are performed simultaneously by simply contacting the metal to be coated with a body of furfural at a temperature of at least 100° C. When this is done, the various assistants previously mentioned for the various operations, such as resinification catalyst, desiccants, added free-oxygen-containing gas, surface active agents, etc. can be used, provided they do not have a detrimental effect on any step of the coating process; strongly acidic and basic materials generally are detrimental to the steps of applying and/or curing the coating composition, so strongly acidic or basic materials such as sodium hydroxide, sulfuric acid, etc., are preferably not used according to this embodiment of the invention. Thus, if a desiccant is employed according to this embodiment, it should be one which is not strongly acidic or basic, e. g. it may be lithium chloride, calcium chloride, alumina, calcium sulfate, silica gel, glycerol, glycols, etc.

The chemical structure of the furfural resin coatings of the present invention is not known. The furfural resin which is contacted with the metal to be coated generally consists of a relatively large acetone-soluble portion and a relatively small acetone insoluble portion. Both are believed to be essential to the formation of the coating, the acetone-insoluble portion probably acting as the body-forming agent, and the acetone-soluble portion probably acting as a binder. In the hardening of the coating, the acetone-soluble portion may be converted into acetone-insoluble material.

The coated metal product obtained as described above is useful in a variety of applications where corrosive materials are handled. Corrosion-resistant coatings according to the invention may be deposited on metals generally, e. g. iron, steel, ferrous alloys, Admiralty metal, etc.

According to the invention, various types of metal equipment are provided for the handling of corrosive materials; e. g. heat exchangers, condensers, conduits, reaction vessels, distillation towers, valves, etc., can be coated with furfural resin prior to use, according to the invention, in commercial applications where they come in contact with corrosive materials.

The manner in which various types of equipment are coated can vary with the type. For small metal objects, immersion in heated furfural is highly suitable. For large apparatus, a highly suitable coating method is to circulate furfural, heated above 100° C., through the apparatus in contact with the surfaces to be coated until the desired thickness of coating is built up. For example, a tubular heat exchanger or condenser fully assembled, can be coated by flowing furfural heated above 100° C. through the exchanger or condenser, either on the tube side or the shell side or both, until the desired thickness of coating is built up.

Coatings prepared according to the invention are resistant to corrosive materials generally, since, for most of the commonly used metals, the corrosion undergone by a furfural-coated metal when subjected to the corrosive material is less than the corrosion undergone by the same metal without the furfural coating. Coated metal prepared according to the invention is preferably used in applications where the temperature is not substantially above 250° C., since, although the coating provides some protection when used at temperatures above 250° C., the rate of corrosion may nevertheless be disadvantageously high. Also, such coated metal is preferably used in applications where the corrosive material involved is not of the strongly oxidizing type, such as nitric acid, sulfuric acid, or phosphoric acid, since, although some protection is provided against corrosive material of that type, the rate of corrosion may nevertheless be disadvantageously high.

Coatings prepared according to the invention are particularly resistant to a wide variety of corrosive materials including various corrosive aqueous materials and various organic materials, e. g. hydrocarbon materials containing corrosive aqueous contaminants, such as aqueous solutions or suspensions of corrosive ions, compounds, or elements, such as iron, ammonium, chloride, fluoride, carbonate, sulfide, sulfite, sulfate ions, free sulfur, etc.

The following examples illustrate the invention:

*Example I*

An inhibited Admiralty metal coupon was coated with furfural resin, and the coated coupon was compared for corrosion resistant properties with an uncoated inhibited Admiralty metal coupon.

The coated coupon was prepared by immersing the coupon in furfural and refluxing for 1056 hours, at the end of which time the surface of the coupon was completely covered by a dull black, adherent coating of furfural resin. The furfural employed in making this coating had previously been employed in solvent extraction of mineral oil and had, at the beginning of the coating operation, an acidity of about 0.2 percent as acetic acid equivalent, the acidity having been developed during the use in solvent extraction of mineral oil.

The coated coupon mentioned above, together with an uncoated Admiralty metal coupon, was immersed in the corrosive liquid material described subsequently, and the latter was refluxed in an atmosphere of nitrogen for a period of 18 hours. The weight loss undergone by each coupon during the 18 hour period was determined by weighing each coupon before and after that period.

The corrosive material employed in the above test was a petroleum refinery stream known as depropanizer reboiler liquid, a material which is obtained in distillation of light hydrocarbons for removal of propane therefrom, and which comprises mainly hydrocarbons having four to six carbon atoms together with a small amount of corrosive aqueous material containing dissolved or suspended contaminants including ammonium, iron, carbonate, sulfide, thiosulfate, sulfite, and sulfite ions, free sulfur, etc.

The weight loss undergone by the uncoated, inhibited Admiralty metal coupon during exposure to the corrosive material was 0.12 percent, whereas the weight loss undergone by the furfural resin coated Admiralty metal was only 0.015 weight percent showing that the resin coating provides substantial protection against corrosion by the corrosive material.

Metal coupons having furfural resin coatings on the surfaces thereof were found in additional tests to be resistant to corrosion by various other corrosive liquid materials including the following: a petroleum refinery stream known as deethanizer reflux, a material employed as reflux in the distillation of light hydrocarbons to remove ethane therefrom, and comprising mainly hydrocarbons having less than three carbon atoms together with a small amount of corrosive aqueous material similar to that in depropanizer reboiler liquid; a petroleum refinery stream known as depropanizer feed, which is charged to distillation for removal of propane, and which comprises mainly hydrocarbons having less than six carbon atoms together with a small amount of corrosive aqueous material similar to that in depropanizer reboiler liquid; and a petroleum refinery stream known as propane work tank liquid, a material obtained in the recovery of propane from extracts and raffinates obtained in extraction of lubricating oil with propane and phenol-cresol mixtures, and comprising mainly propane with small amounts of oil and phenol and aqueous material containing dissolved or suspended contaminants including hydrogen sulfide, free sulfur, etc.

In another test, a length of inhibited Admiralty metal tubing, which had been coated with furfural resin by immersion in refluxing furfural for 558 hours, was exposed to 50 percent aqueous hydrogen fluoride at 220° F. for 552 hours, at the end of which time the tubing was found to be completely covered still by a uniform, dull black coating of furfural resin.

Thus, furfural resin coatings have been found to be resistant to corrosion by five highly corrosive petroleum refinery streams. Therefore, it is highly advantageous to employ metal having such coatings thereon in those parts of petroleum refinery apparatus, e. g. heat exchange tubes, which are subject ordinarily to corrosion by such corrosive streams.

*Example II*

In this example, the effect of sodium bicarbonate was determined on the rate of coating formation in a coating process where the metal to be coated was immersed in furfural heated above 100° C. Steel coupons were immersed in two portions of furfural containing respectively, no sodium bicarbonate, and 10 cc. of saturated aqueous sodium bicarbonate per 200 cc. of furfural, and the two portions of furfural were refluxed for 190 hours. At the end of this period, the coupons were removed from the two portions of furfural, washed with water, and weighed to determine their rate of weight gain. The results are shown in the following table:

| Run No. | $NaHCO_3$ | Rate of Coating Formation in mg./sq. in./hr. |
| --- | --- | --- |
| 1 | Absent | 0.004 |
| 2 | Present | 0.020 |

The table shows that the presence of sodium bicarbonate accelerates the rate of coating formation.

It is to be noted that the effect of sodium bicarbonate in increasing the rate of coating formation cannot be necessarily attributed to any effect it may have in increasing the rate of resinification of furfural, for the rate of resinification and the rate of coating formation are not entirely dependent one on the other, and there are conditions under which the rate of resinification is increased without increasing the rate of coating formation or with concurrent decrease in the rate of coating formation. Also, in some instances, the rate of resinification may be increased with a concurrent increase in the rate of coating formation, the resulting coating, however, having poor adherence and mechanical strength. Generally, the strongly acidic or basic catalysts or assistants, such as sulfuric acid, sodium hydroxide, etc., though increasing the rate of resinification, are inferior to a mildly alkaline material such as alkali metal bicarbonate, for use in a coating operation according to the present invention.

*Example III*

In this example, the effect of desiccants on the rate of coating formation was determined in a coating process where the metal to be coated was immersed in furfural heated above 100° C. Steel coupons were immersed in three portions of furfural containing, respectively, no desiccant, one gram of anhydrous calcium sulfate (trademark "Drierite") per 232 grams of furfural, and one gram of alumina per 100 grams of furfural, and each portion of furfural was refluxed for 65 hours. At the end of the refluxing period, the coupons were removed from the portions of furfural, washed with water, and weighed to determine the rate of weight gain. The results are shown in the following table:

| Run No. | Desiccant | Refluxing Period in Hours | Rate of Coating Formation in mg./sq. in./hr. |
| --- | --- | --- | --- |
| 1 | None | 65 | 0.006 |
| 2 | "Drierite" | 65 | 0.012 |
| 3 | Alumina | 65 | 0.012 |

The table shows that both calcium sulfate and alumina desiccants increase the rate of coating formation.

It is believed that the use of desiccants as described in this example probably increases the rate of condensation polymerization of furfural, the desiccant adsorbing water produced in the condensation reaction and thereby shifting the reaction equilibrium in the condensation toward the product side. As shown in the example, the use of the desiccant also increases the rate of coating formation, though the latter, as previously noted, does not necessarily increase as a result of increase in the rate of resinification. Strongly basic desiccants such as the sodium hydroxide-asbestos desiccant known by the trademark "Ascarite" do not generally provide as good results with respect to rate of coating formation as do the calcium sulfate and alumina desiccants discussed above.

*Example IV*

In this example, the effect of surface active agents on the rate of coating formation was determined in a coating process where the metal to be coated was immersed in furfural heated above 100° C. Steel coupons were immersed in two portions of furfural containing, respectively, no additive and 0.25 volume percent of a surface active agent known by the trademark "Tergitol Penetrant 08" and comprising mainly sodium alkyl sulfate having the following formula: $C_4H_9CH(C_2H_5)CH_2SO_4Na$. Each portion of furfural was refluxed for 76 hours. At the end of the refluxing period, the coupons were removed from the furfural, washed with water, and weighed. The results are shown in the following table:

| Run No. | Surface Active Agent | Rate of Coating Formation in mg./sq. in./hr. |
| --- | --- | --- |
| 1 | Absent | 0.004 |
| 2 | Present | 0.014 |

The table shows that the presence of the surface active agent increases the rate of coating formation.

*Example V*

A steel coupon was coated with furfural resin by immersion of the coupon in furfural to which green sulfonic acids had been added, and refluxing the furfural for a prolonged period of time.

The green acids used had been prepared by sulfonation of mineral lubricating oil and recovery of green acids from the other sulfonation products by dissolving the sulfonation products in petroleum naphtha and allowing the heavier green acids to separate from the lighter oil and solvent layer containing dissolved mahogany sulfonic acids. The green acids obtained had sulfur content of about 11.9 weight percent, and specific gravity of 1.2, and contained about 28 weight percent unsulfonated oil, 10 percent water, 17 percent sulfuric acid, and 45 percent sulfonic acids. 0.1 weight percent of these green acids were added to furfural, and the steel coupon was immersed in the furfural. The furfural was then refluxed for a prolonged period of time, at the end of which the coupon was removed from the furfural, immediately washed with water, and weighed to determine the weight gain of the coating as a result of the coating deposited thereon. From this weight gain, the rate of coating formation per unit time and unit of surface area of the coupon was determined. The following table shows the results obtained as compared with the results obtained in similar operation in the absence of green sulfonic acids.

| Run No. | Green Acids | Rate of Coating Formation mg./sq. in./hr. |
| --- | --- | --- |
| 1 | Absent | 0.003 |
| 2 | Present | 0.041 |

The above table shows that the addition of green acids greatly increases the rate of formation of furfural resin coating on the metal. The coating obtained in run 2 was hard and adherent and capable of protecting the metal from various types of corrosion; the coating was dull black in appearance and evenly covered the metal surface so that the base metal was not visible. The coating obtained in run 1 was not sufficiently thick to give the dull black appearance of the other coating, and the base metal was visible through the coating, the latter appearing as a stain on the surface; thus, it was indicated that substantially longer refluxing periods would be required to obtain a coating as thick as those obtained in run 2.

In all of the preceding examples, the resinification of furfural, formation of the coating composition, application, and curing thereof were all performed concurrently by heating furfural containing the metal to be coated to a temperature above 100° C. for an extended period. In other experiments, highly satisfactory results have been obtained by heating the furfural, in the absence of the metal to be coated, for an extended period to resinify the furfural and contacting the metal surface with the resulting suspension of furfural resin in furfural, with or without previous dilution of the furfural resinification product with additional furfural. In the following example, such operation is described, added air being used to assist in the resinification step.

*Example VI*

Air was bubbled through furfural at about 30° C. in an iron vessel for 168 hours. The air rate was about 0.4 lb. air/lb. furfural/hour. The product obtained was a suspension of black furfural oxidation resin in furfural, the suspension having a kinematic viscosity at 100° F. of about 46.5 centistokes and an acidity, measured as acetic acid equivalent, of 8.99 weight percent. The original furfural had 1.1 centistokes viscosity. The product was diluted with four volumes of furfural. A steel coupon was immersed in the diluted suspension, and the latter was refluxed for four hours, at the end of which time the coupon was removed from the hot suspension and cooled to room temperature by washing with cold water. The base metal of the coupon was no longer visible, a dull black coating having been formed thereon. The rate of formation of the coating during the four hour refluxing period was about 0.9 mg./sq. in./hr.

A coupon coated in a manner similar to that described above was immersed in 1% aqueous hydrochloric acid for 66 hours at ordinary temperature without heating during which time it underwent weight loss of about 0.33 weight percent. An uncoated steel coupon similarly tested underwent weight loss of about 1.26 weight percent.

The term, furfural resin, as used in the present specification and in the appended claims, refers to a resin prepared by resinifying a resin-forming material consisting essentially of furfural, regardless of the manner in which the resin was prepared. Thus, the furfural resin referred to includes not only resin produced by merely heating furfural or by allowing it to stand in a container open to the atmosphere, but also to resin formed with the assistance of a suitable catalyst, e. g. sodium bicarbonate, to furfural oxidation resin formed with the assistance of added oxygen introduced into a body of furfural, as by blowing air therethrough as disclosed in applicant's copending application, Serial No. 132,425, filed December 10, 1949, now abandoned, or to resin formed with the assistance of any other suitable material in the presence of which the resin or coating formation takes place, as for example green sulfonic acids or a desiccant or a surface active agent, etc. Similarly the furfural resin coatings referred to in the specification and claims refer to coatings prepared from furfural resins which were themselves prepared by any of the methods referred to above. Whether or not the chemical nature of the furfural resin and of the coating prepared therefrom varies with the method of preparation, the resins and coatings referred to herein are not restricted to those prepared by any particular method. The reason for this inclusiveness is that, provided that furfural is the sole resin-forming material, the resin prepared therefrom, though it may differ somewhat depending on the presence or absence of certain assisting materials, is always essentially the same for the purposes of the present invention, i. e. in regard to its corrosion-resistant properties.

When employing, according to the invention, a coating composition comprising furfural and a furfural resin, a particular advantage resides in the fact that the metal surface to be coated does not have to be as carefully precleaned as when previous coating methods are used. For example, the metal surface does not have to be entirely free of oil before the coating composition is applied, since the furfural in the coating composition removes oil from the surface before the coating forms. Also, when the coating composition according to the invention has an acidic reaction, the metal surface to be coated need not be entirely free from rust, since small quantities of rust will be removed by the coating composition before the coating forms. Since the cleaning of metal surfaces is a large item of expense in prior art coating methods, the elimination of all but the most cursory cleaning is an important advantage of the present invention.

The time required to obtain a corrosion-resistant coating according to the invention varies with the manner of coating, but may be readily determined by visual observation of the surface of the metal to be coated. When the coating operation has been continued for a time sufficient to deposit enough furfural resin to completely cover the metal surface with a black coating and to render the metal surface invisible, a corrosion-resistant coating has been formed, and the coating operation may be terminated, though it is advantageous to continue the coating operation further to increase the thickness and corrosion-resistance of the coating. The coating may be either dull or shiny in appearance, depending on the condition of the metal surface prior to deposition of the coating.

This application is a continuation-in-part of applicant's copending application Serial No. 132,425, filed December 10, 1949, now abandoned, disclosing and claiming the formation of furfural resin coatings on metal by a process involving the use of added oxygen to assist in the resin formation and/or the coating formation, the coated metal product thereby obtained, and the handling of corrosive liquids other than furfural by contacting such liquid with the coated metal product.

The invention claimed is:

1. The process which comprises: contacting metal with a coating agent comprising liquid furfural, solid furfural resin, and a minor amount of a desiccant other than a strongly acidic or strongly basic desiccant, at a temperature of at least 100° C., thereby to form a hard, adherent coating consisting essentially of furfural resin on said metal, and contacting in a process other than one involving the use of furfural, the coated metal equipment with liquid material that ordinarily effects corrosion of unprotected surfaces of the metal equipment.

2. The process which comprises: contacting metal with a coating agent comprising a liquid carrier, solid furfural resin, and a minor amount of a surface active agent, at a temperature of at least 100° C., thereby to form a hard adherent coating consisting essentially of furfural resin on said metal, and contacting in a process other than one involving the use of furfural, the coated metal equipment with liquid material that ordinarily effects corrosion of unprotected surfaces of the metal equipment.

3. The process which comprises: contacting metal with a coating agent comprising liquid furfural, solid furfural resin, and a minor amount of an alkali metal bicarbonate, at a temperature of at least 100° C., thereby to form a hard, adherent coating consisting essentially of furfural resin on said metal, and contacting in a process other than one involving the use of furfural, the coated metal equipment with liquid material that ordinarily effects corrosion of unprotected surfaces of the metal equipment.

4. The process which comprises: contacting metal with a coating agent comprising liquid furfural solid furfural resin, and a minor amount of petroleum sulfonic acids, at a temperature of at least 100° C., thereby to form a hard, adherent coating consisting essentially of furfural resin on said metal, and contacting in a process other than one involving the use of furfural, the coated metal equipment with liquid material that ordinarily effects corrosion of unprotected surfaces of the metal equipment.

5. The process which comprises: contacting metal with a coating ageent comprising liquid furfural and solid furfural resin, at a temperature of at least 100° C.; and adding free-oxygen-containing gas to said coating agent during said contacting; thereby to form a hard, adherent coating consisting essentially of furfural resin on said metal, and contacting in a process other than one involving the use of furfural, the coated metal equipment with liquid material that ordinarily effects corrosion of unprotected surfaces of the metal equipment.

6. The process which comprises: introducing free-oxygen-containing gas into furfural, thereby to form solid furfural resin in said furfural; and contacting metal with a coating agent comprising a liquid carrier and said solid furfural resin, at a temperature of at least 100° C., thereby to form a hard, adherent coating consisting essentially of furfural resin on said metal, and contacting in a process other than one involving the use of furfural, the coated metal equipment with liquid material that ordinarily effects corrosion of unprotected surfaces of the metal equipment.

7. The process which comprises pre-forming on the surface of metal equipment a coating consisting essentially of furfural resin; and contacting, in a process other than one involving the use of furfural, the coated metal equipment with liquid material that ordinarily effects corrosion of unprotected surfaces of the metal equipment.

8. The process which comprises: contacting metal with a coating agent comprising a liquid carrier, solid furfural resin, and a minor amount of an alkali metal alkyl sulfate surface active agent, at a temperature of at least 100° C., thereby to form a hard adherent coating consisting essentially of furfural resin on said metal, and contacting in a process other than one involving the use of furfural, the coated metal equipment with liquid material that ordinarily effects corrosion of unprotected surfaces of the metal equipment.

9. Method according to claim 2 wherein only one such surface active agent is employed.

10. The process which comprises contacting metal equipment with a coating agent comprising liquid furfural and solid furfural resin at a temperature of at least 100° C., thereby to form a hard, adherent coating consisting essentially of furfural resin on said metal equipment; and contacting in a process other than one involving the use of furfural, the coated metal equipment with liquid material that ordinarily effects corrosion of unprotected surfaces of the metal equipment.

11. Process according to claim 10 wherein said liquid furfural has been previously employed in a mineral oil extraction process.

References Cited in the file of this patent

UNITED STATES PATENTS

| | | |
|---|---|---|
| 1,665,234 | Trickey et al. | Apr. 10, 1928 |
| 1,896,158 | Calcott et al. | Feb. 7, 1933 |
| 2,059,441 | Converse | Nov. 3, 1936 |
| 2,174,887 | Kiefer | Oct. 3, 1939 |
| 2,350,609 | Hachmuth | June 6, 1944 |
| 2,366,049 | Payne et al. | Dec. 26, 1944 |
| 2,499,275 | McWhorter | Feb. 28, 1950 |
| 2,571,994 | Thomas | Oct. 23, 1951 |